W. E. SLOAN.
FLUSH VALVE.
APPLICATION FILED JAN. 12, 1905.
1,114,397.
Patented Oct. 20, 1914.
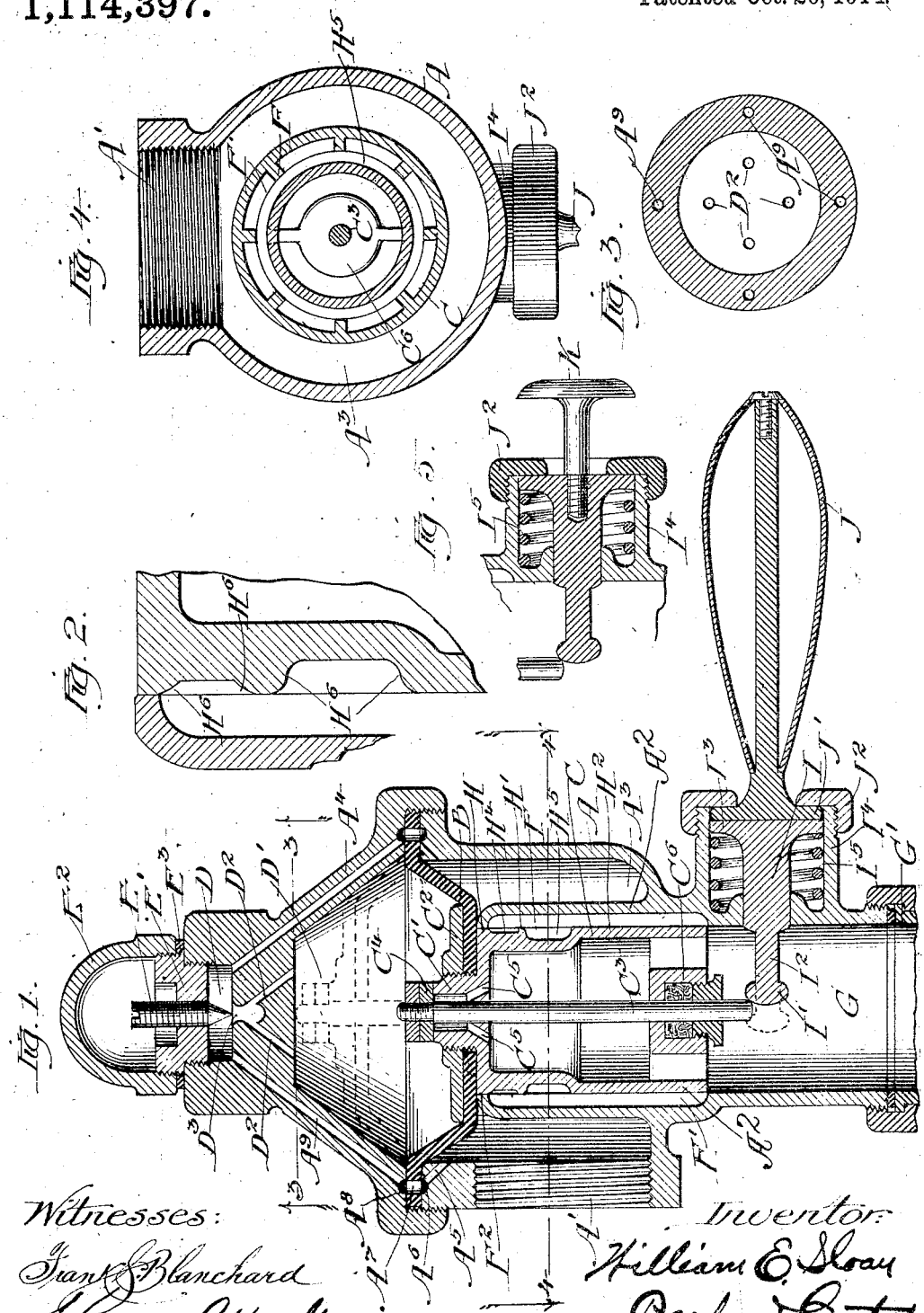

UNITED STATES PATENT OFFICE.

WILLIAM E. SLOAN, OF CHICAGO, ILLINOIS, ASSIGNOR TO SLOAN VALVE COMPANY, OF CHICAGO, ILLINOIS, A CORPORATION OF ILLINOIS.

FLUSH-VALVE.

1,114,397.

Specification of Letters Patent.

Patented Oct. 20, 1914.

Application filed January 12, 1905. Serial No. 240,715.

*To all whom it may concern:*

Be it known that I, WILLIAM E. SLOAN, a citizen of the United States, residing at Chicago, in the county of Cook and State of Illinois, have invented a certain new and useful Improvement in Flush-Valves, of which the following is a specification.

My invention relates to flush valves, and has for its object to provide a new and improved valve of this description.

My invention is illustrated in the accompanying drawings, wherein—

Figure 1 is a sectional view through a valve embodying my invention; Fig. 2 is an enlarged detail of a portion of the movable part of the device; Fig. 3 is a sectional view taken on line 3—3 of Fig. 1; Fig. 4 is a sectional view taken on line 4—4 of Fig. 1; Fig. 5 is a view showing a modified construction.

Like letters refer to like parts throughout the several figures.

In the drawings I have shown a construction of flush valve adapted to be used in all connections where such valve is desirable, such, for example, as for flushing water closets and the like.

Referring now to Fig. 1, the valve casing A is provided with a suitable connection or inlet $A^1$ for connecting it to a source of water supply. Within the casing A is a cylinder $A^2$ surrounded by a space $A^3$ into which the water from the supply has free access. Associated with the casing A is a diaphragm B which is fastened to a piston C working in the cylinder $A^2$. As herein shown the casing A is provided with a removable cap $A^4$ and the diaphragm is held between the edges of the cap and the casing. The casing is preferably provided with a connection $A^5$ which leads to a groove $A^6$ in the upper edge of the casing, and which communicates with the chamber $A^3$, this connection being made so that it communicates with the water at its largest diameter of flow, being back of the inlet $A^1$ and at the point where the chamber enlarges back of said inlet. A series of connections $A^5$ may be located at various points around the casing. The diaphragm is also provided with holes $A^7$ which communicate with a groove $A^8$ in the edge of the cap $A^4$ so that the water may pass from the chamber $A^3$ through the connections $A^5$ to said groove. A series of passageways $A^9$ are associated with the cap $A^4$ and communicate with the groove $A^8$. These passageways lead to a compartment D located above the chamber $D^1$ and communicating therewith by means of passageways $D^2$ having a common inlet $D^3$. By this arrangement the water is conducted from chamber $A^3$ to chamber $D^1$. Means is provided for adjusting the flow of this water, and as herein shown such means consists of the adjustable screw or valve E, by means of which the inlet $D^3$ may be controlled. This valve is connected with a removable holding piece $E^1$. A cover $E^2$ is provided for said valve, and a suitable packing $E^3$ is interposed between this cover and the cap $A^4$ to prevent the escape of any water that may leak through the valve.

The diaphragm B is connected with the piston C in any desired manner. As herein shown the piston is provided with an upwardly projecting part $C^1$ which passes through the diaphragm, the diaphragm being held in position by the plate $C^2$. Associated with the piston C is an auxiliary valve device comprising a rod $C^3$ which passes up through the projecting portion $C^1$. This rod is provided at its end with a valve $C^4$ which seats upon the end of the projecting part $C^1$ and closes the passageways $C^5$ connecting the chamber $D^1$ with the interior of the piston C, such piston being hollow, as shown. The rod passes through a frictional device of some kind associated with the piston, such, for example, as the stuffing box $C^6$. It will be seen that by this frictional or holding device the valve $C^4$ may be held away from its seat. The cylinder $A^2$ is provided with a series of ribs F separated by spaces $F^1$ (see Fig. 4). These ribs guide the piston, and the water passes between them. This arrangement prevents tilting and binding of the piston and permits the passage of the water in spite of the fact that the piston has three points of the same diameter as the inlet or mouth of the cylinder $A^2$, as shown at H, $H^1$ and $H^2$. The piston C is provided with two ports $H^4$ and $H^5$. The points H, $H^1$ and $H^2$ act as cutoffs when they come opposite the upper edge of the cylinder. The port $H^4$ is small as compared with the port $H^5$. The port $H^5$ is the main port, while $H^4$ is the refill port. The edges of said ports are inclined, as shown at $H^6$, Fig. 2, so that there is a gradual closing of the ports. This cushions the movement of the piston, and prevents hammer during the operation thereof. When either of the enlarged or cutoff parts of the piston is opposite the upper edge $F^2$ of the cylinder, the admission of water from the chamber $A^3$ to the chamber G and the pipe $G^1$ is cut off. When the valve is closed the diaphragm also engages the top of the cylinder and acts to close the end of the cylinder. An actuating part I projects through the casing with its end in proximity to the rod $C^3$. Said end is enlarged as shown at $I^1$, there being a reduced portion $I^2$ back of said enlargement. This actuating part has a guiding part $I^3$ which operates in a guide $I^4$. A retracting device, such as the spring $I^5$, is associated with the actuating part I, and is located within the guide $I^4$. The actuating part may be operated in any desired manner.

As shown in Fig. 1 a handle J is provided with an enlarged engaging piece $J^1$ which projects into the guide $I^4$ and which is held in place by the holding piece $J^2$, through which the handle projects. It will be seen that if the handle J is moved in any direction the engaging piece $J^1$ will be tilted so as to push the actual part I inwardly, as shown, for example, in dotted lines in Fig. 1. It will be seen that by this construction it matters not which way the handle J may be moved, the same effect will be produced, for any movement thereof will tilt the engaging piece $J^1$ and the tilting thereof causes the actuating part to move inwardly. When the handle is released the spring moves the parts back to their initial position, as shown in full lines in Fig. 1. Instead of having the handle J, I may use a push-button K (see Fig. 5), said push-button being connected directly to the actuating part. If the push-button is pressed it will be seen that the actuating part will be moved forward, and that the parts will be returned to their initial position when the push-button is released. In the drawing I have shown the inlet $A^1$ in the same plane with the actuating part I, and handle J. The relative position of these two parts will, of course, depend upon the conditions presented and they would perhaps most often be 90 degrees apart, although this relative position can be any position the conditions necessitate.

I have described in detail a particular construction embodying my invention, but it is of course evident that the parts may be varied in many particulars, and that some of the parts may be omitted and others used with parts not herein shown without departing from the spirit of my invention. I, therefore, do not limit myself to the particular construction illustrated.

When the diaphragm is used it is desirable to arrange some way to lessen the pressure on the diaphragm from the operating chamber in case the pressure in the controlling chamber is greatly reduced, as, for example, in starting up the device or in case a proper flow of water to the controlling chamber is interrupted. As shown in the drawings I secure this result by making the inner face of the cap inclined. The plate $C^2$ is preferably made of such diameter that when the diaphragm is in its maximum up position, as shown in dotted lines in Fig. 1, this plate will engage the face of the cap and the part of the diaphragm between the plate and the confined edge will rest against the inclined face, as shown in said dotted lines. It will be seen that by this means if the pressure is entirely removed from the controlling chamber the pressure in the operating chamber cannot damage the diaphragm or injuriously strain it.

The use and operation of my invention are as follows: Under normal conditions the parts are as shown in full lines in Fig. 1. If now it is desired to flush the bowl, the handle J is moved in any direction most convenient. This moves the actuating part I inwardly. The enlargement $I^1$ engages the rod $C^3$ and because of the inclined engaging face or faces lifts the rod. This unseats the valve $C^4$ and permits the water in the upper chamber $D^1$ to escape into the chamber G. The pressure above the diaphragm is thus relieved, and the pressure of the water below it lifts it. This carries the piston C and associated parts upward. The movement in this case is ordinarily rapid. When the parts are in their maximum up position, the end of the rod $C^3$ strikes the top of the cap $A^4$ and is moved against the resistance of the stuffing box $C^6$ so as to seat the valve $C^4$. The parts are shown in this position in dotted lines in Fig. 1. When in this position the enlarged part $H^2$ of the piston C is opposite the upper edge $F^2$ of the cylinder, and consequently the escape of the water is prevented. The seating of the valve $C^4$ prevents the escape of the water from the chamber $D^1$ and hence said chamber begins to fill and the diaphragm is moved downwardly. When the port $H^5$ reaches the edge $F^2$ of the cylinder the water flows over said edge through said port and the spaces $F^1$ into the chamber G, and thence into the bowl or to any other point where it is to be used. As the piston moves downwardly the cutoff $H^1$ comes opposite the edge $F^2$ and the flow of water ceases. The incline of the edges of the port causes a gradual cut off, and prevents hammer. The water flowing through the port $H^5$ flows with great velocity so as to flush the bowl. It is desirable, however, that after being flushed the bowl be filled with water. This is done by the re-fill port $H^4$. A further downward movement of the piston C brings this port opposite the edge F² and water is permitted to flow into the chamber G, but in smaller quantities, and with less force. This water re-fills the bowl. It is, of course, evident that the dimensions of the parts, etc., will be adjusted to meet the conditions presented. The piston C continues its movement until the cut off H is opposite the edge F² and the diaphragm engages said edge. The chamber D¹ is then filled and the flow of water stopped. The parts are regulated and arranged so as to produce any desired flow required. When the piston reaches its maximum down position the parts, if the handle has been released, will be in the position shown in full lines. If, however, the handle should have been held in an inclined position the valve will not be held open, but the end of the rod will come opposite the reduced portion I² of the actuating part. If the handle is now released a second flush will occur. It will thus be seen that by this arrangement the valve cannot be held open, and the most that can be done by holding the handle of the actuating device is to produce a second operation of the valve. If the push-button is used instead of the handle J, the flushing is produced by simply pushing the push-button. It will be seen that the actuating device of Fig. 1 comprises two separate members kept in contact by the spring I⁵.

It will be noted that in this construction what may be termed the valve seat is at the upper end of the cylinder A², and that the piston C and associated parts are so arranged that during its upward movement there is no useful escape of water from the operating chamber. This construction permits the full pressure in the operating chamber to be utilized to force up the diaphragm to its maximum up position for the purpose of seating the valve C⁴. By utilizing this full pressure for seating the valve it will be seen that a proper seating thereof will always be insured. The useful flow of water does not occur until after this valve is seated, and during the downward movement of the piston. By having the seat of the piston at the top of the cylinder A² the spaces F' constitute the discharge for the water; in other words, in this arrangement the cylinder A⁴ becomes part of the dischargeway for the water, for as soon as the water is released at the upper edge it is free to flow to its destination. It is of course evident that a slow upward movement of the piston and a rapid downward movement thereof might be secured if desired by varying the sizes of the passageways through which the water enters into and escapes from the controlling chamber.

I claim:

1. A valve device comprising a valve, an actuating mechanism having two parts separated from each other and mounted in the same guide, said parts having flattened ends which make contact with each other and an elastic device for keeping said parts in proper relation, both of said parts separate from said valve.

2. A valve device comprising a valve, an actuating mechanism having a guiding part separate from the valve and moving in a direction substantially at right angles thereto and provided with an enlarged end connected with the main body of the actuating part by a reduced portion, a guide in which said actuating part moves, a handle separate from the guiding part and provided with a part working in said guide, a spring in said guide normally pressing the actuating part and the handle part together.

3. A valve device comprising a casing divided into two chambers, one the controlling chamber and the other the operating chamber, means for connecting said chamber with a source of water supply, a valve for relieving the pressure in the controlling chamber, means for moving the parts so as to permit the water to flow from the operating chamber when said pressure is relieved, a projecting part associated with said valve, an actuating mechanism comprising an actuating part separate from the valve and moving in a direction substantially at right angles thereto and provided with an enlarged end adapted to engage said projecting part and connected with the body of the actuating part by a reduced portion, a guide in which said actuating part moves and means for moving said actuating part to its initial position when released.

4. A valve device comprising a casing divided into two chambers, one the controlling chamber and the other the operating chamber, means for connecting said chambers with a source of water supply, a valve for relieving the pressure in the controlling chamber, means for moving the parts so as to permit the water to flow from the operating chamber when said pressure is relieved, a projecting part associated with said valve, an actuating mechanism comprising an actuating part separate from the valve and moving in a direction substantially at right angles thereto and provided with an enlarged end adapted to engage said projecting part and connected with the body of the actuating part by a reduced portion, a guide in which said actuating part moves, a handle provided with a part working in said guide and adapted to be tilted when the handle is moved so as to move said actuating part.

5. A valve device comprising a casing, a diaphragm extending across said casing and dividing it into two chambers, a connection between each of said chambers and a source of water supply, a cylinder in one chamber, a piston connected with said diaphragm and working in said cylinder, an auxiliary valve mounted upon said piston and provided with a projecting stem which projects into said cylinder, an actuating mechanism for said auxiliary valve having two parts separate from each other and mounted in the same guide, one of said parts adapted to engage said stem, said parts having flattened ends which make contact with each other, and an elastic device for keeping said parts in proper relation, both of said parts separate from said valve.

6. A valve device comprising a casing divided into two chambers, one the controlling chamber and the other the operating chamber, means for connecting both of said chambers with a source of water supply, a cylinder in one of said chambers, a piston working in said cylinder, an escape valve for said controlling chamber adapted when operated to permit the escape of the water from the controlling chamber, an actuating mechanism for said valve having two parts separate from each other and mounted in the same guide, the ends of said parts in operative engagement, and an elastic device for keeping said parts in proper relation, both of said parts separate from said piston.

7. A valve device comprising a main valve controlling the discharge of the water, a controlling device for said main valve, an actuating mechanism therefor having two parts separated from each other and mounted in the same guide, said parts having flattened ends which make contact with each other, and an elastic device for keeping said parts in proper relation, both of said parts separate from said valve.

WILLIAM E. SLOAN.

Witnesses:
HOMER L. KRAFT,
LUCY A. FALKENBERG.